3,072,097
ANIMAL TRAINING DEVICE
Charles A. Morchand, 288 Lexington Ave.,
New York, N.Y.
Filed Nov. 18, 1960, Ser. No. 70,253
4 Claims. (Cl. 119—29)

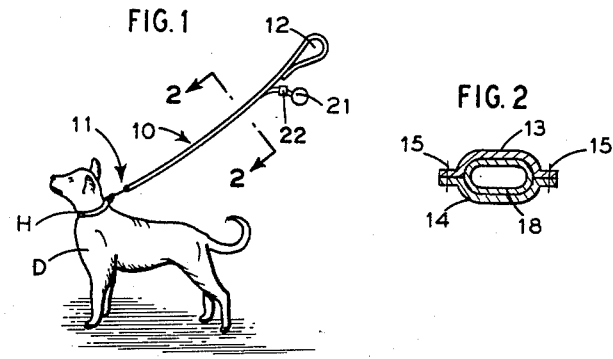
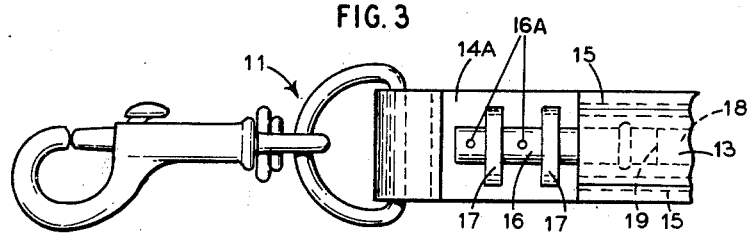
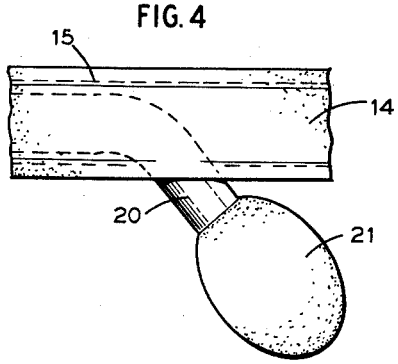
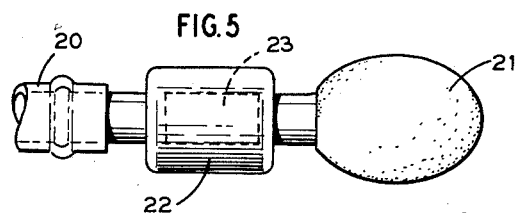

This invention relates to animal training devices, and more particularly, concerns devices for training dogs.

A number of devices have been proposed for training dogs; which devices are basically punishment means operating cutaneously to administer an electric shock. It has been found that such known devices are of limited effectiveness, and further, may leave the animal with adverse residual effects, thereby making further training even more difficult. Also, shocking devices, even when controlled as to intensity, are generally regarded as inhumane and many animal owners are unwilling to use the same.

Accordingly, an object of this invention is to provide an improved animal training device, which is non-cutaneous; does not administer a shock to the animal; which is humane in its application and is highly efficient as a training means.

A further object of this invention is to provide an improved animal training device which is based on audio means located adjacent the ears of the animal for emitting a note of selected pitch which constitutes an effective signal for training purposes and is without residual adverse effects on the animal.

Another object of this invention is to provide improved animal training means which is of a simplified structure, inexpensive to manufacture, requires no maintenance or battery replacements, is readily adapted to the training of a particular animal and avoids antagonism in the animal when used.

Referring to the drawing,

FIG. 1 is an elevational view showing a dog carrying the training device embodying the invention;

FIG. 2 is a sectional view taken on the line 2—2 of FIG. 1;

FIG. 3 is an enlarged view showing one end of the dog leash;

FIG. 4 is an enlarged view showing a portion of the leash, adjacent the other end thereof; and FIG. 5 is an enlarged partial view showing a modified form of the device.

Essentially the animal training device of the instant invention comprises a suitable audible signal producing device such as a high pitched whistle, which is mounted at one end of a leash, so as to be located adjacent the ears of the animal when the leash is attached to the usual harness in place on the animal. A tubing extends along the length of the leash, being connected to the whistle and to an air bulb located adjacent the terminal end of the leash. Thus, by squeezing the bulb, an audible sound of suitable intensity is emitted at a point adjacent the ears of the animals to provide means for training the animal.

Thus, as shown in FIG. 1, the dog D carries the usual harness H, to which is detachably secured leash means 10 by a hook 11. The leash means 10 terminates in the usual loop 12. Leash means 10 comprises a pair of leather strips 13, 14 secured together by stitching 15. At the hook end of leash 10, strip 14 is extended beyond strip 13 to provide a portion 14A for mounting thereon a high pitched whistle 16 having sound outlets 16A, which may be held in place by cross strips 17 stitched in place.

Between leash strips 13, 14 is located an elongated flexible tubing of rubber or the like 18, which is connected at one end to the inlet portion 19 of whistle 16. The tubing 18 extends along leash 10 to a point adjacent loop 12 and a terminal portion 20 thereof projects outwardly and to one side of strips 13, 14 and has a compressible air bulb 21 connected thereto. As indicated in FIG. 1, bulb 21 is located adjacent loop 12 to facilitate the manipulation thereof.

It will be apparent that in training dog D, one holding leash loop 12 may be an appropriate moment squeeze bulb 21 to actuate whistle 16 to cause the same to emit a high pitched sound adjacent the ears of the animal, and thereby cause an association between the sound perceived by the animal and a particular act of the animal. The intensity of the emitted sound may be varied by appropriate manipulation of the bulb 21, which includes the usual air inlet means, not shown, to permit air to be drawn into the bulb upon release thereof.

Whistle 16 may be selected as to its pitch to suit a particular animal or specific training sequences. It has been found that animals react more favorably to audio stimulants than to cutaneous stimulants; and the punishment factor of the latter appears to be eliminated or materially modified, thereby improving the training program for the animal.

Audible signals for training the animal may be augmented by olfactory stimulus. Thus, as shown in FIG. 5, leash means 10 may also have associated therewith odorant containing means 22 which is detachably connected between end portion 20 of tubing 18 and bulb 21. Odorant containing means 22 takes the form of a small canister which may be opened to insert therein an odorant body 23.

Thus, when bulb 21 is compressed to actuate whistle 16, the incident air flow through means 22, is also operable to carry with it volatile portions of body 23 in container means 22. The odor producing means may also take other forms including powder; volatile liquid; gas and the like, and of a selected odor. Such odorant is adapted to have a desired stimulant effect on the animal when the odorant is released from the openings in whistle 16 and is detected by the nose of the animal, concomitantly with the audible signal derived from whistle 16.

It is understood that in lieu of compressible bulb 21, other means capable of providing a fluid actuating means for whistle 16, may be used. Thus a gas containing cartridge with suitable trigger means for releasing the same, may be connected to the terminal end of tubing 18, to provide a controlled amount of gas for actuating whistle 16.

As various changes might be made in the embodiments of the invention herein disclosed without departing from the spirit thereof, it is understood that all matter herein shown or described is illustrative and not limiting except as set forth in the appended claims.

What is claimed is:

1. A training device in the form of a leash, said leash comprising an elongated hollow member having at one end thereof hand holding means and at the other end thereof a hook attachment means adapted to be attached to a dog collar, tubing means extending along and through said hollow member, said tubing means having a manually operable means at one end and a signal producing means at the other end, whereby operation of said manually operable means will actuate said signal producing means to produce a signal.

2. A training device as in claim 1 wherein said signal producing means is a whistle in communication with one end of said tubing means and said signal producing means is a compressible bulb in communication with the other end of said tubing means.

3. A training device as in claim 2 and further including means for carrying odoriferous material in communication with said tubing means, whereby operation of said compressible bulb is effective to pneumatically carry a portion of said odoriferous material to said whistle for emission therefrom concomitantly with the actuation of said whistle.

4. A training device in the form of a leash, said leash comprising an elongated flexible tubular member, looped hand holding means at one end of said member, hook attachment means adapted to be attached to a dog collar, at the other end of said member; compressible bulb means in communicating relation with said one end of the tubular member, and signal producing whistle means in communicating relation with the other end of said tubular member for actuation upon compression of said bulb means.

References Cited in the file of this patent

UNITED STATES PATENTS

| | | |
|---|---|---|
| 2,023,950 | Carter | Dec. 10, 1935 |
| 2,652,809 | Foster | Sept. 22, 1953 |
| 2,851,991 | Rinck | Sept. 16, 1958 |
| 2,894,478 | Reed et al. | July 14, 1959 |

FOREIGN PATENTS

| | | |
|---|---|---|
| 1,139,052 | France | Feb. 4, 1957 |

OTHER REFERENCES

Magazine Section of Washington Times Herald, page 4, June 1, 1941.